United States Patent
Lewellen

(10) Patent No.: US 6,957,960 B2
(45) Date of Patent: Oct. 25, 2005

(54) METHOD AND APPARATUS KIT FOR DEMONSTRATING ARCHIMEDES' PRINCIPLE

(76) Inventor: Richard R. Lewellen, 1760 W. Smithville-Western Rd., Wooster, OH (US) 44691

( * ) Notice: Subject to any disclaimer, the term of this patent is extended or adjusted under 35 U.S.C. 154(b) by 10 days.

(21) Appl. No.: 10/790,166

(22) Filed: Mar. 1, 2004

(65) Prior Publication Data

US 2005/0191602 A1 Sep. 1, 2005

(51) Int. Cl.$^7$ ............................ G09B 23/06; A63F 9/00
(52) U.S. Cl. ...................... 434/126; 434/300; 434/276; 446/153; 446/160; 446/161; 273/350
(58) Field of Search ............................... 434/126, 300, 434/276; 446/153, 156, 160, 161; 273/350; 177/190, 191, 207

(56) References Cited

U.S. PATENT DOCUMENTS

| 3,434,716 A | * | 3/1969 | Schwartz ...................... 463/64 |
| 3,559,989 A | * | 2/1971 | Breslow ...................... 273/450 |
| 3,878,624 A | * | 4/1975 | DeFelice ...................... 434/300 |
| 3,895,801 A | * | 7/1975 | Baird .......................... 273/350 |
| 5,344,156 A | * | 9/1994 | Levin .......................... 273/355 |
| 5,722,871 A | * | 3/1998 | Zamir ........................ 446/153 |

OTHER PUBLICATIONS

"Fluid Mechanics—List of Demonstrations" available on the internet as early as Feb. 2, 1999.*

* cited by examiner

Primary Examiner—Jessica Harrison
Assistant Examiner—Dmitry Suhol
(74) Attorney, Agent, or Firm—Kathleen K Bowen

(57) ABSTRACT

A kit for demonstrating Archimedes' principle, comprising a tub having an overflow spout, such that when fluid reaches the overflow spout, all additional fluid added to the tub will flow out the overflow spout; and a stable boat sized to float in the tub without touching the sides of the tub. The kit may further comprise a balance beam which can balance a tub edge, wherein one end of the balance beam has an attachment mechanism for attaching a counter weight, and the other end has an attachment mechanism for attaching a sample weight, such that when the sample weight is attached, and the balance beam is balancing on the tub edge, the sample weight will be submerged in the fluid. There is also a method for using this kit to demonstrate Archimedes' principle both for the buoyancy of a floating body, and the buoyancy for objects that don't float.

15 Claims, 3 Drawing Sheets

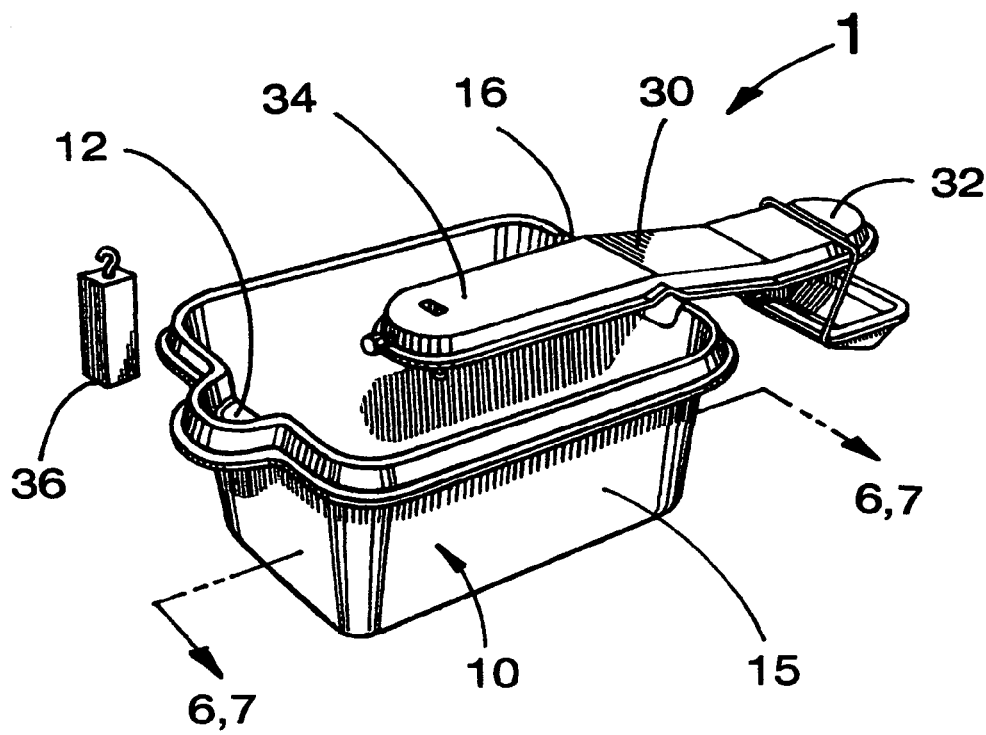
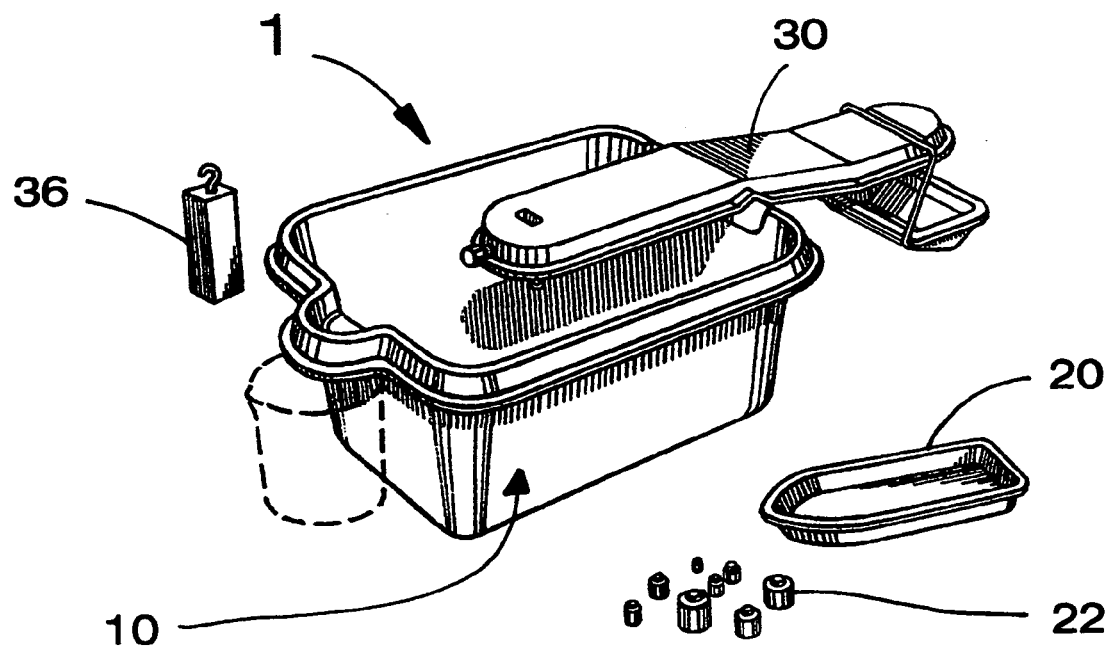

Fig. 5
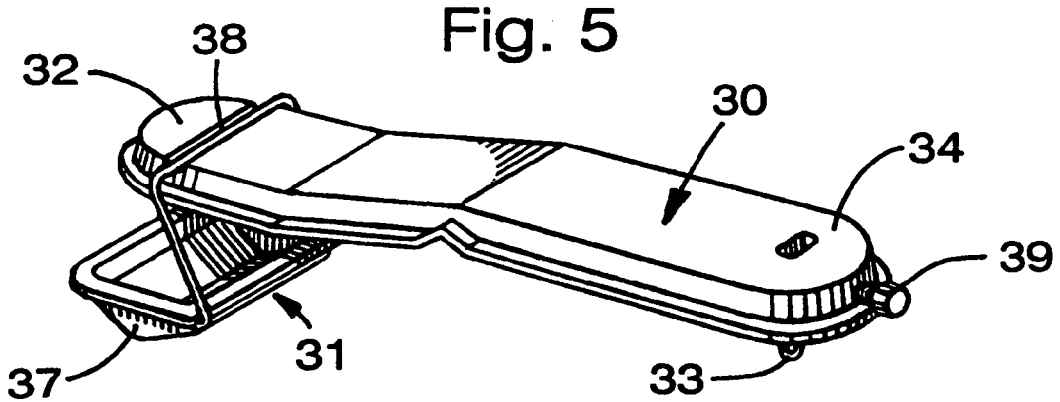
Fig. 6 ( Sect. 6,7)
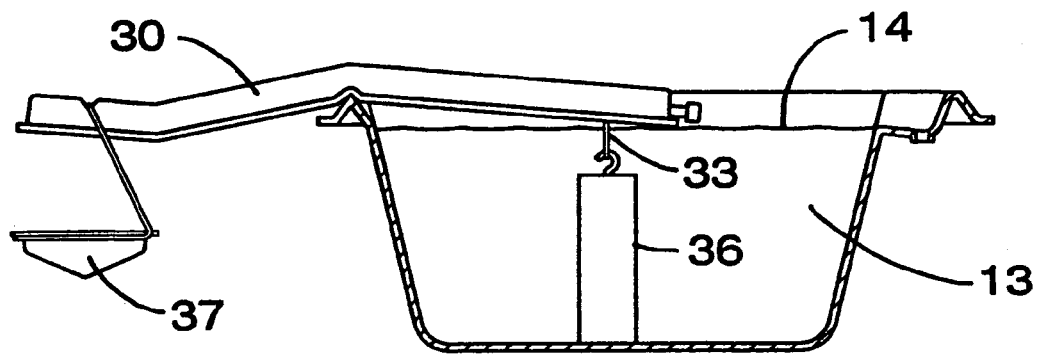
Fig. 7 (Sect. 6,7)
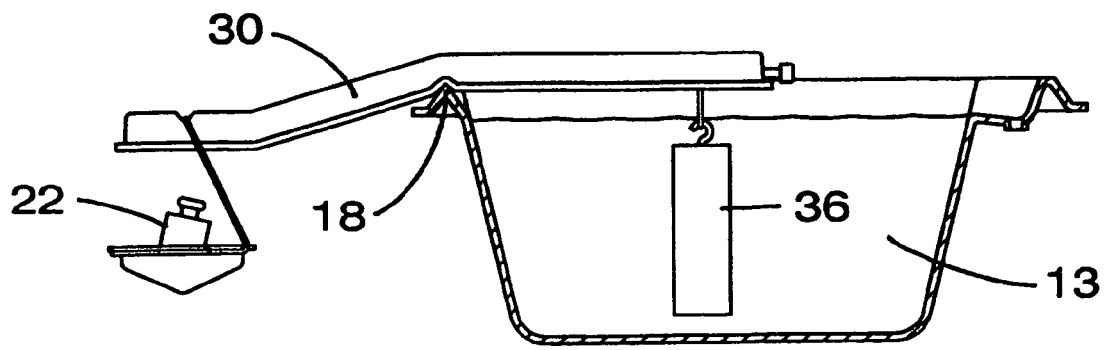

METHOD AND APPARATUS KIT FOR DEMONSTRATING ARCHIMEDES' PRINCIPLE

BACKGROUND

The present invention is in the field of science lab equipment. More specifically this invention relates to demonstrating a specific principle, particularly Archimedes' Principle.

When teaching scientific principles in a classroom setting, demonstrations are a very helpful learning tool. Archimedes' principle states that a body wholly or partially immersed in a fluid will be buoyed up by a force equal to the weight of the fluid it displaces. A kit is desired which could demonstrate various aspects of Archimedes' principle, which would include almost everything needed to perform the demonstration, and which would be simple to use.

SUMMARY OF THE INVENTION

An apparatus kit for demonstrating Archimedes' principle comprises a tub for holding fluid, wherein the tub has sides, and further has an overflow spout, such that when a fluid level reaches the overflow spout, all additional fluid added to the tub will flow out of the overflow spout; and a stable boat sized to float in the tub without touching the sides of the tub. The kit may further comprise a balance beam which can balance on a top edge of the tub sides, wherein the balance beam comprises a first end and a second end, wherein the first end has a first means for attaching weight, and the second end has a second means for attaching a sample weight such that the sample weight attached to the second end will be submerged in the fluid in the tub when the balance beam is balancing on the top edge of the tub sides.

Further provided is a method for demonstrating Archimedes' principle showing buoyancy for a floating object, which comprises the steps of filling a tub with a fluid to the point of overflow, wherein the tub has sides, and further has an overflow spout, such that when a fluid level reaches the overflow spout, all additional fluid added to the tub will flow out of the overflow spout and will be designated as overflow fluid; placing an overflow catcher under the overflow spout to catch all overflow fluid; placing a boat in the tub, wherein the boat is a stable boat, sized to float in the tub without touching the sides of the tub; placing weights into the boat, wherein the weights are not enough to make the boat sink; weighing the overflow fluid which has flowed into the overflow catcher as a result of placing the boat and weights in the fluid; and, comparing the weight of the overflow fluid to the combined weight of the boat plus the weights placed in the boat.

Further there is a method for demonstrating Archimedes' principle showing buoyancy for an object which does not float, comprising the steps of filling a tub with a fluid to the point of overflow, wherein the tub has sides and wherein the sides have a top edge, and wherein the tub further has an overflow spout, such that when a fluid level reaches the overflow spout, all additional fluid added to the tub will flow out of the overflow spout and will be designated as overflow fluid; placing an overflow catcher under the overflow spout to catch all overflow fluid; placing a first sample weight into the fluid; weighing the overflow fluid which has flowed into the overflow catcher; balancing a balance beam on a top edge of the tub sides, wherein said balance beam comprises a first end and a second end, wherein said first end has a first means for attaching weight, and said second end has a second means for attaching sample weight such that the sample weight attached to said second end will be submerged in the fluid in said tub when the balance beam is balancing on the edge of the tub; attaching the sample weight to the beam second end; attaching a counter weight or weights to the beam first end, until the beam is again balanced on the top edge of the tub side; weighing the counter weights; and comparing the weight of the sample weight to the combined weight of the overflow fluid plus the weight of the counter weights.

BRIEF DESCRIPTION OF THE DRAWINGS

FIG. 3 is an isometric view of an apparatus kit for demonstrating Archimedes' principle according to an aspect of the invention.

FIG. 4 is an isometric view of an apparatus kit for demonstrating Archimedes' principle according to an aspect of the invention.

FIG. 5 is an isometric view of a balance beam according to an aspect of the invention.

FIG. 6 is a cross-section view from FIG. 3, according to an aspect of the invention.

FIG. 7 is a cross-section view from FIG. 3, according to an aspect of the invention.

DETAILED DESCRIPTION

Figure 1:
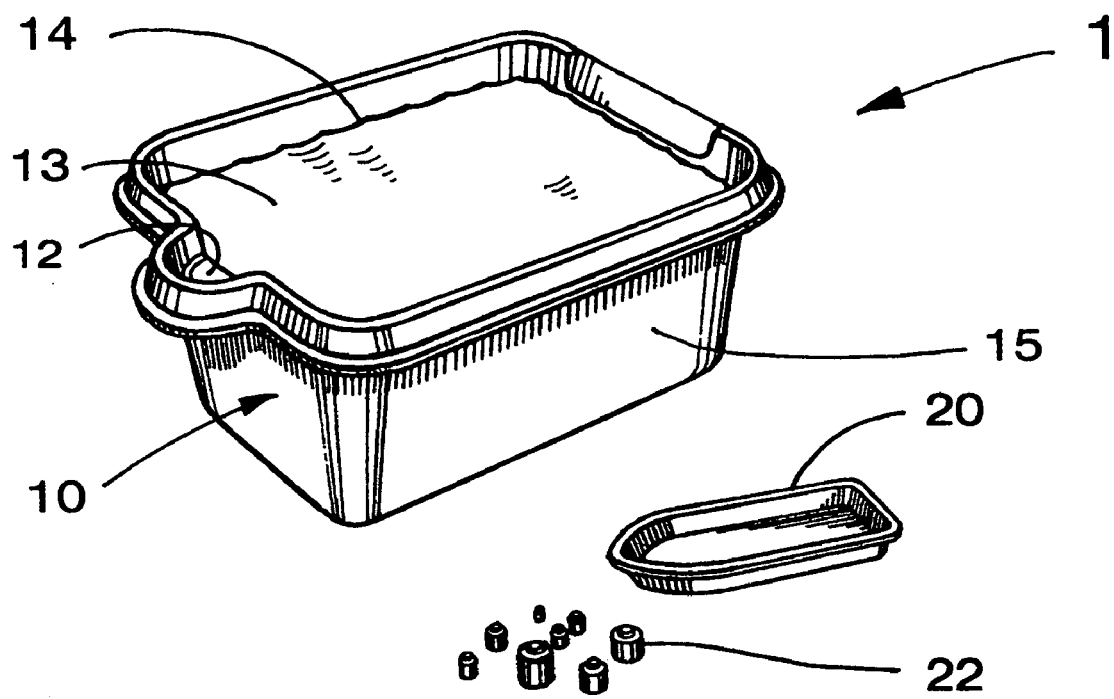
FIG. 1 is an isometric view of an apparatus kit for demonstrating Archimedes' principle according to an aspect of the invention.
Figure 2:
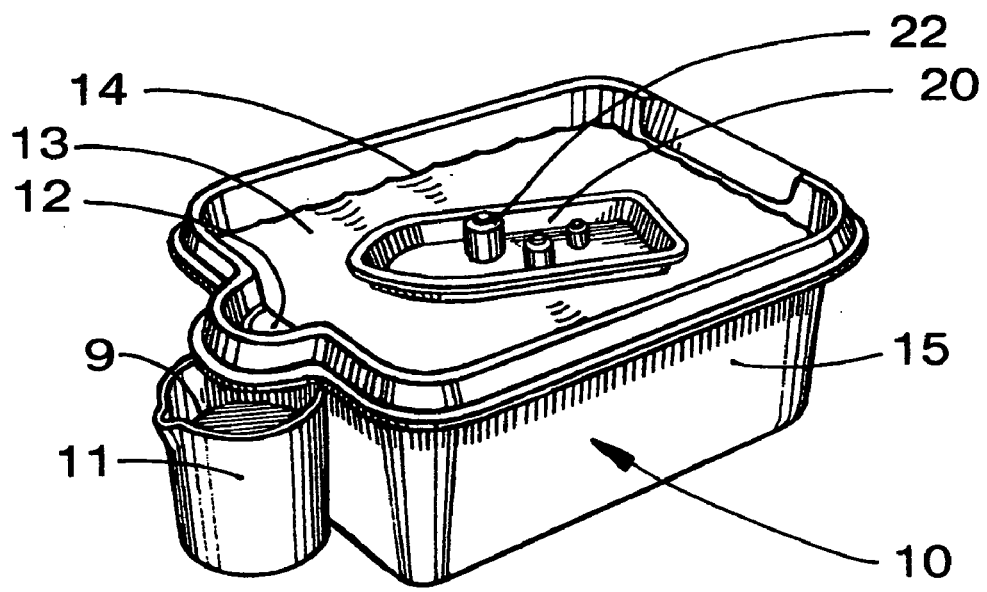
FIG. 2 is an isometric view of an apparatus kit in use for demonstrating Archimedes' principle according to an aspect of the invention.

Various aspects of the invention are presented in FIGS. 1–7 which are not drawn to scale and in which like components are numbered alike. Referring now to FIGS. 1–2, according to an aspect of the invention, an apparatus kit 1 for demonstrating Archimedes' principle comprises a tub 10 for holding fluid wherein the tub 10 has sides 15, and a stable boat 20 sized to fit in the tub 10 without touching the sides 15 of the tub 10. The tub 10 has an overflow spout 12, such that when a fluid level 14 reaches the overflow spout 12, all additional fluid added to the tub 10 or displaced by the boat 20 will flow out of the overflow spout 12. This kit is useful for demonstrating buoyancy for a floating object.

According to a further aspect of the invention, the kit 1 further comprises weights 22 which are sized to fit in the boat 20 without sinking the boat 20.

Referring now to FIGS. 3–7, in another embodiment of the invention, an apparatus kit 1 for demonstrating Archimedes' principle comprises a tub 10 for holding fluid wherein the tub 10 has sides 15, and a balance beam 30. The tub 10 has an overflow spout 12, such that when a fluid level 14 reaches the overflow spout 12, all additional fluid added to the tub, or displaced by the boat 20, will flow out of the overflow spout 12. The tub 10 sides 15 have a top edge 16. The balance beam 30 can balance on a top edge 16 of the tub sides 15, and comprises a first end 32 and a second end 34, wherein the first end 32 has a first means 31 for attaching a counter weight 22 or weights, and the second end 34 has a second means 33 for attaching a sample weight 36. The beam 30 is configured such that the sample weight 36 attached to the second end 34 will be submerged in the fluid in the tub 10 when the balance beam 30 is balancing on an edge 16 of the tub 10 (see FIG. 7). The top edge 16 of the tub sides 15 may further comprise a fulcrum 18, for balancing the balance beam 30. This kit is useful for demonstrating buoyancy with objects that do not float.

According to another aspect of the invention, the first means 31 for attaching counter weight 22 to the first end 32 comprises a tray 37 hanging from a groove 38 in the first end 32.

In a preferred embodiment of the invention, the balance beam 30 further comprises an adjustment means 39, for adjusting the center of gravity of the balance beam 30, to allow the balance beam 30 to be balanced on the edge of the tub. According to a further aspect of the invention, the adjustment means 39 is an adjustment screw on the balance beam second end 34, which can be turned in or out.

The kit 1 may further comprise sample weights 36 of simple geometric shape, which can be attached to the balance beam second end 34. The simple geometric shape, such as a rectangular or circular extrusion, is useful because it allows for easier calculation of the volume of the sample weight. This is helpful because part of the demonstration may focus on the volume of water displaced.

According to a preferred embodiment of the invention, the two kits above could be combined into a kit which could be used for demonstrating Archimedes' principle both for the buoyancy of a floating body, and the buoyancy for objects that do not float. This kit comprises a tub 10 for holding fluid wherein the tub 10 has sides 15 having a top edge 16, a stable boat 20 sized to float in the tub 10 without touching the sides 15, and a balance beam 30 which can balance on an edge 16 of the tub sides 15. Each of these elements are the same as described above. According to a further aspect of this invention, the combined kit further comprises weights 22 which are sized to fit in the boat 20 without sinking the boat 20.

According to a further aspect of this embodiment, the first means 31 for attaching counter weight 22 to the balance beam first end 32 comprises a tray 37 hanging from a groove 38 in the first end 32.

According to another aspect of this invention, the balance beam 30 further comprises an adjustment means 39, for adjusting the center of gravity of the balance beam 30, to allow the balance beam 30 to be balanced on an edge 16 of the tub sides 15. According to a further aspect of this invention, this adjustment means 39 is an adjustment screw on the balance beam first end 32, which can be turned in or out.

Sample weights 36 of simple geometric shape may also be included in the kit according to an aspect of the invention. These sample weights should be attachable to the balance beam second end 34 such that when attached, each sample weight 36 is submersed under the fluid 13 (when the tub 10 is full of fluid).

The top edge 16 of the tub sides 15 may further comprise a fulcrum 18 for balancing the balance beam 30.

According to a preferred embodiment of the invention, a method for demonstrating Archimedes' principle showing buoyancy for a floating object comprises the following steps. Fill a tub 10 with a fluid 13 to the point of overflow, wherein the tub 10 has sides 15, and further has an overflow spout 12, such that when a fluid level 14 reaches the overflow spout 12, all additional fluid added to the tub 10 will flow out of the overflow spout 12 and be designated as overflow fluid 9. Next, place an overflow catcher 11 under the overflow spout 12 to catch all overflow fluid 9. The overflow catcher 11 could be anything capable of holding fluid, with a top open enough to catch all the overflow. Two examples are a beaker or a cup.

Next, place a boat 20 in the tub 10, wherein the boat 20 is a stable boat, sized to float in the tub 10 without touching the sides 15 of the tub 10. Then place weights 22 into the boat 20, wherein the weights 22 are not enough to make the boat 20 sink.

Next, weigh the overflow fluid which has flowed into the overflow catcher 11, and compare the weight of the overflow fluid 9 to the combined weight of the boat 20 plus the weights 22 placed in the boat 20.

According to another aspect of the invention, a method for demonstrating Archimedes' principle showing buoyancy for an object which does not float comprises the following steps. Filling a tub 10 with a fluid to the point of overflow, wherein the tub 10 has sides 15 and wherein the sides 15 have a top edge 16, and further wherein the tub 10 has an overflow spout 12, such that when a fluid level 14 reaches the overflow spout 12, all additional fluid added to the tub will flow out of the overflow spout 12 and be designated as overflow fluid 9. Then place an overflow catcher 11 under the overflow spout 12 to catch all overflow fluid 9. Next place a sample weight 36 into the fluid 13. Then weigh the overflow fluid 9 which has flowed into the overflow catcher 11.

Next, balance a balance beam 30 on a top edge 16 of a tub side 15. The balance beam 30 comprises a first end 32 and a second end 34, wherein the first end 32 has a first means 31 for attaching weight 22, and the second end 34 has a second means 33 for attaching a sample weight 36 such that the sample weight 36 attached to the second end 34 will be submerged in the fluid 13 in the tub 10 when the balance beam 30 is balancing on the top edge 16 of the tub side 15.

Then attach the sample weight 36 to the balance beam second end 34. Next attach a counter weight or weights 22 to the balance beam first end 34, until the balance beam 30 is again balanced on the top edge 16 of the tub side 15.

Weigh the counter weights 22, and compare the weight of the sample weight 36 to the combined weight of the overflow fluid 9 plus the weight of the counter weights 22.

What is claimed is:

1. An apparatus kit for demonstrating Archimedes' principle, the kit comprising:
    a tub for holding fluid, wherein said tub has sides and wherein said sides have a top edge, and further has an overflow spout, such that when a fluid level reaches said overflow spout, all additional fluid added to the tub will flow out of the overflow spout; and,
    a balance beam which can balance on a top edge of said tub sides, wherein said balance beam comprises a first end and a second end, wherein said first end has a first means for attaching a counter weight, and said second end has a second means for attaching a sample weight such that the sample weight attached to said second end will be submerged in the fluid in said tub when the balance beam is balancing on the top edge of said tub sides.

2. The kit of claim 1 wherein said means for attaching counter weight to said first end comprises a tray hanging from a groove in said first end.

3. The kit of claim 1 wherein said balance beam further comprises an adjustment means, for adjusting the center of gravity of said balance beam, to allow the balance beam to be balanced on the edge of said tub.

4. The kit of claim 3 wherein said adjustment means is an adjustment screw on the beam second end, which can be turned in or out.

5. The kit of claim 1 which further comprises one or more sample weights of simple geometric shape, which can be attached to the beam second end.

6. The kit of claim 1 wherein said tub further comprises a fulcrum for balancing said balance beam.

7. An apparatus kit for demonstrating Archimedes' principle, the kit comprising:
    a tub for holding fluid, wherein said tub has sides and wherein said sides have a top edge, and wherein said tub further has an overflow spout, such that when a fluid level reaches said overflow spout, all additional fluid added to the tub will flow out of the overflow spout;
    a stable boat sized to float in said tub without touching the sides of said tub; and,
    a balance beam which can balance on a top edge of said tub sides, wherein said balance beam comprises a first end and a second end, wherein said first end has a first means for attaching weight, and said second end has a second means for attaching weight such that the weight attached to said second end will be submerged in the fluid in said tub when the balance beam is balancing on the top edge of said tub sides.

8. The kit of claim 7 further comprising weights which are sized to fit in the boat without sinking the boat.

9. The kit of claim 7 wherein said first means for attaching counter weight to said first end comprises a tray hanging from a groove in said first end.

10. The kit of claim 7 wherein said beam further comprises an adjustment means, for adjusting the center of gravity of said beam, to allow the beam to be balanced on the top edge of said tub sides.

11. The kit of claim 10 wherein said adjustment means is an adjustment screw on the beam second end, which can be turned in or out.

12. The kit of claim 7 which further comprises one or more sample weights of simple geometric shape, which can be attached to the beam second end.

13. The kit of claim 7 wherein said top edge of said tub sides further comprises a fulcrum for balancing said balance beam.

14. A method for demonstrating Archimedes' principle showing buoyancy for a floating object, the steps comprising:
    filling a tub with a fluid to the point of overflow, wherein said tub has sides, and further has an overflow spout, such that when a fluid level reaches said overflow spout, all additional fluid added to the tub will flow out of the overflow spout and will be designated as overflow fluid;
    placing an overflow catcher under said overflow spout to catch all overflow fluid;
    placing a boat in said tub, wherein said boat is a stable boat, sized to float in said tub without touching the sides of said tub;
    placing weights into said boat, wherein the weights are not enough to make the boat sink;
    weighing the overflow fluid which has flowed into the overflow catcher; and,
    comparing the weight of the overflow fluid to the combined weight of the boat plus the weights placed in the boat.

15. A method for demonstrating Archimedes' principle showing buoyancy for an object which does not float, the steps comprising:
    filling a tub with a fluid to the point of overflow, wherein said tub has sides and wherein said sides have a top edge, and wherein said tub further has an overflow spout, such that when a fluid level reaches said overflow spout, all additional fluid added to the tub will flow out of the overflow spout and will be designated as overflow fluid;
    placing an overflow catcher under said overflow spout to catch all overflow fluid;
    placing a sample weight into the fluid;
    weighing the overflow fluid which has flowed into the overflow catcher;
    balancing a balance beam on an edge of said tub, wherein said balance beam comprises a first end and a second end, wherein said first end has a first means for attaching a counter weight, and said second end has a second means for attaching a sample weight such that the sample weight attached to said second end will be submerged in the fluid in said tub when the balance beam is balancing on the top edge of said tub sides;
    attach said sample weight to said beam second end;
    attaching a counter weight or weights to said beam first end, until the beam is again balanced on the top edge of the tub side;
    weighing said counter weights; and,
    comparing the weight of the sample weight to the combined weight of the overflow fluid plus the weight of the counter weights.

* * * * *